US010214611B2

United States Patent
Voci et al.

(10) Patent No.: US 10,214,611 B2
(45) Date of Patent: Feb. 26, 2019

(54) IMPACT MODIFIERS FOR EPOXY-BASED ADHESIVES

(71) Applicant: SIKA TECHNOLOGY AG, Baar (CH)

(72) Inventors: Tina Voci, Zürich (CH); David Hofstetter, Winterthur (CH); Christian Krüger, Schlieren (CH); Jan Olaf Schulenburg, Uster (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/442,221

(22) PCT Filed: Nov. 12, 2013

(86) PCT No.: PCT/EP2013/073542
§ 371 (c)(1),
(2) Date: May 12, 2015

(87) PCT Pub. No.: WO2014/072515
PCT Pub. Date: May 15, 2014

(65) Prior Publication Data
US 2016/0272750 A1    Sep. 22, 2016

(30) Foreign Application Priority Data

Nov. 12, 2012 (EP) .................................... 12192264

(51) Int. Cl.
| | |
|---|---|
| *C08G 18/40* | (2006.01) |
| *C08G 18/48* | (2006.01) |
| *C08G 18/69* | (2006.01) |
| *C08G 18/12* | (2006.01) |
| *C09J 175/04* | (2006.01) |
| *C08G 18/75* | (2006.01) |
| *C09J 9/00* | (2006.01) |
| *C09J 11/08* | (2006.01) |
| *C09J 163/00* | (2006.01) |

(52) U.S. Cl.
CPC ......... *C08G 18/4063* (2013.01); *C08G 18/12* (2013.01); *C08G 18/4854* (2013.01); *C08G 18/698* (2013.01); *C08G 18/755* (2013.01); *C09J 9/00* (2013.01); *C09J 11/08* (2013.01); *C09J 163/00* (2013.01); *C09J 175/04* (2013.01)

(58) Field of Classification Search
CPC ................................................ C08G 18/4063
USPC ....................................................... 525/460
See application file for complete search history.

(56) References Cited

U.S. PATENT DOCUMENTS

| | | | |
|---|---|---|---|
| 4,952,645 A | 8/1990 | Mulhaupt et al. | |
| 5,290,857 A | 3/1994 | Ashida et al. | |
| 2009/0264558 A1* | 10/2009 | Kramer .................. | C08G 18/10 523/400 |
| 2009/0288766 A1* | 11/2009 | Kramer .................. | C08G 18/10 156/275.5 |
| 2010/0009196 A1* | 1/2010 | Kramer .................. | C08G 18/10 428/413 |
| 2010/0116433 A1* | 5/2010 | Finter .................... | C08G 18/10 156/330 |

FOREIGN PATENT DOCUMENTS

| | | |
|---|---|---|
| EM | 0 383 505 A2 | 8/1990 |
| EM | 1 741 734 A1 | 1/2007 |
| EM | 2 060 592 A1 | 5/2009 |
| EP | 0353190 A2 | 1/1990 |
| EP | 1574537 A1 | 9/2005 |
| WO | 2004/055092 A1 | 7/2004 |
| WO | 2005007720 A1 | 1/2005 |

OTHER PUBLICATIONS

May 12, 2015 International Preliminary Report on Patentability issued in Application No. PCT/EP2013/073542.
Dec. 3, 2013 International Search Report issued in International Application No. PCT/EP2013/073542.
Dec. 3, 2013 Written Opinion issued in International Application No. PCT/EP2013/073542.
Feb. 27, 2017 Office Action issued in Chinese Patent Application No. 201380057686.1.

* cited by examiner

*Primary Examiner* — Michael M Dollinger
(74) *Attorney, Agent, or Firm* — Oliff PLC

(57) ABSTRACT

An epoxy group-terminated impact modifier is described, comprising the reaction product of a) two or more polyols, b) one or more polyisocyanates, and c) at least one epoxy resin comprising a primary or secondary hydroxy group-containing epoxy compound, wherein the polyols comprise a1) at least one polyether polyol and a2) at least one OH-terminated rubber, wherein the weight ratio of polyether polyol to OH-terminated rubber is in the range from 7:3 to 2:8; an isocyanate-terminated prepolymer as possible intermediate product is described; furthermore a method for producing same is described. The products obtained are suitable for improving the impact resistance of epoxy resin compositions, in particular of 1K or 2K epoxy resin adhesives.

22 Claims, No Drawings

IMPACT MODIFIERS FOR EPOXY-BASED ADHESIVES

TECHNICAL FIELD

The invention relates to an epoxy group-terminated impact modifier, to an isocyanate-terminated prepolymer as possible intermediate product as well as to methods for producing same, as well as to the use of the impact modifier in 1K or 2K epoxy resin compositions.

PRIOR ART

In the manufacture both of vehicles and add-on parts but also of machines and devices, high quality adhesives are being used increasingly instead of or in combination with conventional joining methods such as screwing, bolting, stamping or welding. This results in advantages and new manufacturing possibilities, for example, the manufacture of composite and hybrid materials or also in greater latitude in the design of components. For use in car manufacturing, these adhesives have to present good adhesion on all the substrates used, in particular, electrolytically zinc-coated, hot-dip galvanized, and additionally phosphated steel plates, oiled steel plates as well as various, optionally surface-treated, aluminum alloys. These good adhesion properties must also persist even after aging (alternating climate, salt spray bath, etc.), without large losses in quality. If the adhesives are used as body shell adhesives in car manufacturing, the resistance of these adhesives to cleaning baths and dip coating (so-called leachability resistance) is of great importance, so that the process reliability at the manufacturing plant can be guaranteed.

In the case of 1K adhesives, the adhesives for body shell construction should cure under the usual stoving conditions of ideally 30 min at 180° C. In the case of 2K adhesives, the curing should take place at room temperature over the course of several days to approximately 1 week, but an accelerated curing regime such as, for example, 4 h RT followed by 30 min 60° C. or 85° C. should also be usable. Moreover, they should also be resistant up to approximately 220° C. Further requirements for such a cured adhesive with regard to bonding are the guarantee of operational reliability both at high temperatures of up to approximately 90° C. and also at low temperatures down to approximately −40° C. Since these adhesives are structural adhesives and therefore these adhesives bond structural parts, high strength and impact resistance of the adhesive are of utmost importance.

Conventional epoxy adhesives are indeed characterized by high mechanical strength, particularly high tensile strength. However, in the case of abrupt stressing of the bond, conventional epoxy resins are usually too brittle and therefore, under crash conditions, wherein both large tensile and peeling stresses occur, they are far from meeting the requirements in particular of the motor vehicle industry. In this regard, the strengths are in particular often insufficient at high temperatures, but particularly at low temperatures (for example, <−10° C.).

From the literature, two methods are known that make it possible to reduce the brittleness of epoxy resins and thus increase their impact resistance: On the one hand, the aim can be achieved by admixing at least partially crosslinked high molecular weight compounds such as latexes of core/shell polymers or other flexibilizing polymers and copolymers. Such a method is described, for example, in U.S. Pat. No. 5,290,857. On the other hand, by introducing soft segments, for example, by the appropriate modification of the epoxy components, a certain toughness increase can be achieved. Thus, in U.S. Pat. No. 4,952,645, epoxy resin compositions are described which were flexibilized by reaction with carboxylic acids, in particular dimeric or trimeric fatty acids, as well as with carboxyl acid-terminated diols.

EP 0353190 A2 relates to a flexibilization component for epoxy resins based on monophenol- or epoxy-terminated polymers. EP 1574537 A1 and EP 1602702 A1 describe epoxy resin adhesive compositions that contain monophenol- or epoxy-terminated polymer as impact modifier.

WO 2004/055092 A1 describes heat curable epoxy resins with improved impact resistance due to the use of an epoxy group-terminated impact modifier in the epoxy resin, wherein the impact modifier is obtained by reacting an isocyanate-terminated prepolymer with hydroxy-terminated epoxy compounds.

WO 2005/007720 A1 describes epoxy group-terminated impact modifiers which are obtained by reacting an isocyanate-terminated prepolymer with hydroxy-terminated epoxy compounds, wherein the impact modifier has at least one aromatic structural element which is incorporated via urethane groups in the polymer chain.

EP 1741734 A1 relates to a heat curable epoxy resin composition which comprises a solid epoxy resin and an impact modifier which can be obtained by reacting a monohydroxyl epoxy compound and an isocyanate-terminated polyurethane polymer, wherein, in an example of the preparation of the polyurethane polymer, a mixture of polyalkylene glycols and hydroxyl-terminated polybutadiene as polyol is used.

EP 2060592 A1 describes heat curing epoxy resin compositions wherein, in an example, the preparation of an impact resistance improver consisting of a mixture of a polyalkylene glycol and a hydroxyl-terminated polybutadiene and isophorone diisocyanate and cardanol as blocking agent is indicated.

EP 0383505 relates to a reactive hot melt adhesive which comprises a urethane prepolymer consisting of a polyisocyanate and a polyether polyol and a thermoplastic elastomer, wherein for the production of the urethane prepolymer, hydroxy-terminated polybutadienes can be used additionally.

DESCRIPTION OF THE INVENTION

The problem of the present invention is to provide impact modifiers for epoxy resin compositions, by means of which crash-resistant adhesives with good and balanced mechanical properties can be obtained, in particular with regard to tensile shear strength, elasticity modulus and impact peel resistance. They should preferably be suitable as constituents of one-component or two-component epoxy resin compositions, in particular adhesives. A further aim is to be able to produce the impact modifiers in a one-step process, in order to simplify the production method.

Potential gelling and formation of inhomogeneities in the production of the epoxy-terminated impact modifiers should, furthermore, be reduced or prevented in order to increase the process reliability thereby.

Surprisingly, the problem could be solved by a method for producing an epoxy group-terminated impact modifier, comprising the reaction of a) two or more polyols of formula (I)

where $Y_1$ stands for an n-valent residue of a reactive polymer after the removal of terminal hydroxyl groups; and n=2, 3 or 4; preferably 2 or 3, b) one or more polyisocyanates of formula (II)

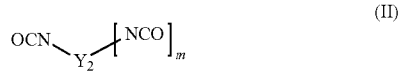

(II)

where $Y_2$ stands for a divalent residue of aliphatic, cycloaliphatic, aromatic or araliphatic diisocyanates after the removal of the isocyanate groups, or for a trivalent residue of trimers or biurets of aliphatic, cycloaliphatic, aromatic or araliphatic diisocyanates after the removal of the isocyanate groups; and m=1 or 2; and c) at least one epoxy resin comprising an epoxy compound of formula (III)

(III)

containing a primary or secondary hydroxy group,
where $Y_3$ stands for a residue of a primary or secondary hydroxyl group-containing aliphatic, cycloaliphatic, aromatic or araliphatic epoxy after the removal of the epoxy groups and of the primary or secondary hydroxyl group; and q=1, 2 or 3, wherein the polyols of formula (I) comprise a1) at least one polyether polyol and a2) at least one OH-terminated rubber, wherein the weight ratio of polyether polyol to OH-terminated rubber is in the range from 7:3 to 2:8.

By the use of the two different polyols in combination, very good mechanical properties could surprisingly be achieved for the cured adhesives. Moreover, the impact modifiers according to the invention could also be produced in a one-step reaction, considerably simplifying the method.

Prepolymers are oligomers or already polymer compounds themselves, which are used as preliminary or intermediate products for synthesizing high molecular weight substances. The prefix poly in expressions such as polyol or polyisocyanate means that the compound comprises two or more of the mentioned groups; a polyol is thus a compound with two or more hydroxy groups. It is known to the person skilled in the art that in polymer compounds, as a rule, there is a mixture of different compounds which can also contain, for example, as yet incompletely reacted compounds. Therefore the polyols present as mixtures can here also have an overall OH equivalent weight of less than 2, for example, greater than 1.5. This accordingly applies to other polymer compounds such as polyisocyanates.

The epoxy group-terminated impact modifiers comprise completely blocked or partially blocked isocyanate-terminated prepolymers. The isocyanate-terminated prepolymers are also referred to as PU polymers.

For the epoxy group-terminated impact modifier, a) two or more polyols of formula (I) are used

(I)

where $Y_1$ stands for an n-valent residue of a reactive polymer after the removal of terminal hydroxyl groups; and n=2, 3 or 4; preferably 2 or 3, wherein the polyols of formula (I) comprise a1) at least one polyether polyol and a2) at least one OH-terminated rubber, wherein the weight ratio of polyether polyol to OH-terminated rubber is in the range from 7:3 to 2:8.

It is possible to use one or more polyether polyols. Suitable are, for example, polyoxyalkylene polyols, also referred to as polyether polyols, which are the polymerization product of ethylene oxide, 1,2-propylene oxide, 1,2- or 2,3-butylene oxide, tetrahydrofuran or mixtures thereof, optionally polymerized by means of a starter molecule with two or three active H atoms such as water or compounds with two or three OH groups, for example. It is possible to use polyoxyalkylene polyols that have a low unsaturation degree (measured according to ASTM D-2849-69 and indicated in milliequivalent unsaturation per gram polyol (mEq/g)), produced, for example, by means of so-called double metal cyanide complex catalysts (abbreviated DMC catalysts), as well as polyoxyalkylene polyols with a higher unsaturation degree, produced, for example, by means of anionic catalysts such as NaOH, KOH or alkali alcoholates. Particularly suitable are polyoxypropylenediols and -triols, in particular with an unsaturation degree of less than 0.02 mEq/g and/or with a molecular weight in the range from 1000 to 30,000 g/mol, polyoxybutylenediols and -triols, polyoxypropylenediols and -triols, in particular with a molecular weight of 400 to 8000 g/mol, as well as so-called "EO-endcapped" polyoxypropylenediols and -triols (provided with ethylene oxide terminal group). The latter are special polyoxypropylene polyoxyethylene polyols that are obtained, for example, by alkoxylating pure polyoxypropylene polyols after the end of the polypropoxylation with ethylene oxide and as a result comprise primary hydroxyl groups.

Particularly preferred polyether polyols are polymerization products of ethylene oxide, 1,2-propylene oxide, 1,2- or 2,3-butylene oxide, tetrahydrofuran or mixtures thereof; particularly preferable are polypropylene oxides and polytetrahydrofurans. Such polyether polyols are commercially available. Commercially available polytetrahydrofurans are, for example, the PolyTHF® products from BASF, such as PolyTHF®2000, PolyTHF®2500 CO or PolyTHF®3000 CO. Commercially available polypropylene oxides are, for example, Caradol® products from Shell, such as Caradol®2000 or Caradol®ED56, or Acclaim® products from Bayer, such as Acclaim® Polyol 2200, Acclaim® Polyol 12200 or Acclaim® Polyol 4200. Further possible polyether polyols are Voranol®1010L, Voranol® EP1900 or Voranol®CP4755 from Dow.

The average molecular weight of the polyether polyols used can vary. The polyether polyols have, for example, a weight average molecular weight (Mw) in the range from 500 to 5000 g/mol, preferably 1000 to 3000 g/mol and particularly preferably in the range from 1500 to 2500 g/mol, in particular approximately 2000 g/mol.

Unless otherwise indicated, the weight average molecular weight is determined by the GPC method in the present application. This is a type of liquid chromatography in which molecules of different size are separated based on their different diffusion volumes. Depending on the polymer to be determined, different separation columns are used for this purpose: columns: SDV 100, 1000, $10^4$ Å, (0.8×30 cm, 5 µm); eluent: THF; flow rate: 1 mL/min; temperature: 35° C.; calibration relative to poly(1,4-butadiene) standard: 831-1,060,000 g/mol; sample preparation: approximately 100 mg sample were dissolved in 10 mL THF and filtered with a 0.45 μm PTFE membrane filter.

The OH functionality of the polyether polyols used is preferably in the range of approximately 2, for example, in the range from 1.9 to 2.1. Optionally, a compound with an OH functionality of 3, such as, for example, butoxylated trimethylolpropane (for example, Simulsol®TOMB), can be added to the polyether polyol in order to increase the OH functionality.

The OH functionality can be measured by titration, for example. The hydroxyl group-containing substance is reacted with an excess of diisocyanate, and after the reaction, the isocyanate excess is determined titrimetrically using a 0.1 M HCl solution, and the hydroxyl number is calculated.

One or more OH-terminated rubbers can be used, wherein the use of two OH-terminated rubbers, in particular two OH-terminated polybutadienes, leads to particularly advantageous properties. Here, OH-terminated rubbers are understood to refer, for example and preferably, to hydroxyl-terminated polybutadienes and to castor oil-based polyols, wherein hydroxyl-terminated polybutadienes are particularly preferable. Castor oil is a triglyceride whose OH functionality is due to the hydroxy group of the ricinoleic acid and therefore represents a polyol. Castor oil is a natural product that is available in various grades, for example, in standard grade, as dehydrated product or with very low acid number. Derivatized castor oil products can also be obtained, for example, oxidatively polymerized castor oil or partially dehydrated castor oil, as a result of which, for example, a lower OH functionality can be set. Polyols based on castor oil include castor oil of various grades, and castor oil derivatives.

Commercially available hydroxyl-terminated polybutadienes are, for example, the Poly Bd® and Krasol® products from Cray Valley, such as Krasol® LBH-P 2000 or Poly Bd® R45V. Castor oil-based polyols are, for example, the Albodur® products from Alberdingk Boley, such as Albodur®901, or the Polycine® products from Baker Castor Oil Company, such as Polycine®-GR80.

The hydroxyl-terminated rubbers used preferably have a weight average molecular weight (Mw) of less than 15,000 g/mol and preferably less than 4000 g/mol.

The OH functionality of the hydroxyl-terminated rubbers used is preferably in the range from 1.7 to 2.2 for anionically produced types or from 2.2 to 2.8 for types produced by free radical polymerization. If the epoxy group-terminated impact modifier is used in a 2K epoxy resin adhesive, it is preferable to use a hydroxyl-terminated rubber, in particular a hydroxyl-terminated butadiene, with an OH functionality of less than or equal to 2. If the epoxy group-terminated impact modifier is used in a 1K epoxy resin adhesive, it is preferable to use a hydroxyl-terminated rubber, in particular a hydroxyl-terminated butadiene, with an OH functionality in the range from 2.4 to 2.8. The mentioned preferred OH functionality for 2K and 1K epoxy resin adhesive can also be achieved in the context of a mixture of two hydroxyl-terminated rubbers, in particular hydroxyl-terminated butadienes.

The weight ratio of polyether polyol to hydroxyl-terminated rubber is in the range from 7:3 to 2:8, preferably 7:3 to 4:6, particularly preferably 7:3 to 5:5, and, furthermore, preferably in the range from 6:4 to 2:8, more preferably 6:4 to 3:7. In this manner, the mechanical properties of the cured adhesive can be improved, in particular the impact peel resistance at −30° C.

The polyether polyols and hydroxyl-terminated rubbers have different solubilities; to that extent, one can also speak of "hydrophilic" polyether polyols and "hydrophobic" hydroxy-terminated rubbers. For the determination of the turbidity (haze), turbidity measurements were carried out in an epoxy resin. For this purpose, the turbidity measurement according to ASTM D1003-11$^{\varepsilon 1}$ was carried out with a turbidity measurement apparatus (Hazemeter, method A). Since the various samples to be examined are fluids, they were measured between glass plates. Spacers were used, so that the thickness of the sample to be measured was 0.3 mm. By blank measurements, the contribution of the glass plates to the turbidity was determined, and the turbidity was then calculated in a manner known to the person skilled in the art for the samples themselves.

In the following table, the turbidity or haze value thus determined according to ASTM D1003-11$^{\varepsilon 1}$ are listed for various polyols in Epikote 828 LVEL (40 wt % polyol, 60 wt % Epikote 828 LVEL, measurements 7 to 10). Turbidity or haze value according to ASTM D1003-11$^{\varepsilon 1}$ for epoxy group-terminated impact modifiers are also listed in the table (20 wt % impact modifier, 80 wt % Epikote 828 LVEL, measurements 2 to 6).

| Measurement | | Haze value |
|---|---|---|
| 1 | 100% Epikote 828 LVEL | 0.2 |
| 2 | 20% impact modifier in Epikote 828 LVEL (50% PolyTHF 2000/40% Krasol LBH P2000/ 10% PolyBD R45V) | 95.1 |
| 3 | 20% impact modifier in Epikote 828 LVEL (70% polyTHF 2000/30% PolyBD R45V) | 48.3 |
| 4 | 20% impact modifier in Epikote 828 LVEL (50% PolyTHF 2000/50% Krasol LBH P2000) | 97.6 |
| 5 | 20% impact modifier in Epikote 828 LVEL (100% PolyTHF 2000) | 0.2 |
| 6 | 20% impact modifier in Epikote 828 LVEL (100% Caradol ED 56) | 0.0 |
| 7 | 60% Epikote 828 LVEL/40% PolyTHF 2000 | 0.1 |
| 8 | 60% Epikote 828 LVEL/40% Caradol ED 56 | 0.0 |
| 9 | 60% Epikote 828 LVEL/40% PolyBD R45V | 98.2 |
| 10 | 60% Epikote 828 LVEL/40% Krasol LBH P2000 | 94.3 |

The measurements show the following. The polyether polyols PolyTHF and Caradol (measurements 7 and 8) can be mixed with epoxy resin and result in no turbidity. On the other hand, the hydroxy-terminated rubbers PolyBD and Krasol (measurements 9 and 10) cannot be mixed with epoxy resin and they result in high turbidity. In the case of the impact modifiers with mixtures of polyols according to the invention (measurements 2 to 4), the turbidity shows that the impact modifiers in the resin form aggregates, which manifests itself in turbidity. The aggregate formation is advantageous for impact resistance. If there is no turbidity, as in the case of the impact modifiers according to the invention of measurements 5 and 6, the impact resistance is poor.

Preferable polyols are those for which a mixture of polyol and of a liquid epoxy resin prepared from bisphenol A and epichlorohydrin such as Epikote 828 LVEL in a weight ratio of 40 to 60 has a haze value measured according to ASTM D1003-11$^{\varepsilon 1}$ in the range from 50 to 100 for hydroxy-terminated rubber as polyol and/or in the range from 0 to 5 for polyether polyol as polyol.

Furthermore, for the epoxy group-terminated impact modifiers according to the invention, it is preferable that a mixture of the impact modifier and of a liquid epoxy resin produced from bisphenol A and epichlorohydrin such as Epikote 828 LVEL in a weight ratio from 20 to 80 has a haze value measured according to ASTM D1003-11$^{ε1}$ in the range from 20 to 100.

Suitable polyisocyanates of formula (II) are diisocyanates or triisocyanates. Suitable diisocyanates are aliphatic, cycloaliphatic, aromatic or araliphatic diisocyanates, in particular commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethyl hexamethylene diisocyanate (TMDI), 2,5- or 2,6-bis(isocyanatomethyl)-bicyclo[2.2.1]heptane, 1,5-naphthalene diisocyanate (NDI), dicyclohexyl methyl diisocyanate ($H_{12}$MDI), p-phenylene diisocyanate (PPDI), m-tetramethyl xylylene diisocyanate (TMXDI), etc., as well as their dimers. HDI, IPDI, MDI or TDI are preferable. Particularly preferable are aliphatic and in particular cycloaliphatic diisocyanates such as, for example, HDI, $H_{12}$MDI and IPDI.

Suitable triisocyanates are trimers or biurets of aliphatic, cycloaliphatic, aromatic or araliphatic diisocyanates, in particular the isocyanurates and biurets of the diisocyanates described in the preceding paragraph.

$Y_1$ in formula (I) can additionally stand for elongated-chain residues of molecules after removal of the OH groups, which formally can be obtained by a reaction similar to the reaction between the already above mentioned diols or triols as well as the already mentioned di- or triisocyanates. This is achieved by varying the stoichiometry of the reaction partners, for which there are two possibilities.

On the one hand, by means of an excess of the OH groups relative to the NCO groups, OH-functional polymers having chains of different lengths can be obtained. Such elongated-chain polyols contain urethane or urea groups in the chain and can be further reacted with other di- or triisocyanates. On the other hand, by means of a substoichiometric amount of the OH groups relative to the NCO groups, NCO-functional polymers having chains of different lengths can be obtained.

The chain length and crosslinking degree of these elongated-chain polymers depend strongly on the molar ratio $[X_1H]/[NCO]$. The closer the ratio is to 1, the longer the chains are. It is clear to the person skilled in the art that excessively long chains or an excessively high crosslinking degree would lead to polymers that are no longer usable. For the chain elongation, diols and diisocyanates are preferable.

As explained later in greater detail, the impact modifier according to the invention can be produced in a one-step or two-step process. In the two-step method, in a first step, the two or more polyols are reacted with the at least one polyisocyanate, as a result of which an isocyanate-terminated prepolymer is obtained, which is then reacted with the epoxy resin.

In an alternative embodiment of the two-step process, for the preparation of the isocyanate-terminated polymer, it is possible to add, in addition to the at least two polyols and the at least one polyisocyanate, as described above, a polyphenol to the reaction. The polyphenols are, for example, bis-, tris- and/or tetraphenols, which can be unsubstituted or substituted polyphenols. In this case, isocyanate-terminated prepolymers are obtained in which at least one aromatic structural element is contained, which is incorporated via urethane groups in the polymer chain. Such compounds are described explicitly in WO 2005/007720, to which reference is made hereby, in particular with regard to the details of the production and the usable components. Thus, suitable polyphenols and suitable preparation pathways are described on pages 9 and 10, and 13 and 14 of this printed document.

For the production of epoxy group-terminated impact modifiers, one or more epoxy resins are reacted additionally. The epoxy resin contains an epoxy compound which comprises a primary or secondary hydroxyl group. The hydroxy epoxy compound of formula (III) comprises 1, 2 or 3 epoxy groups. The hydroxy group of this hydroxy epoxy compound (III) can represent a primary or secondary hydroxyl group. The hydroxy epoxy compound of formula (III) is preferably a monohydroxy epoxy compound.

The epoxy resin is, in particular, a liquid epoxy resin. The epoxy resin contains or consists of hydroxyl-containing species, in particular the hydroxyl epoxy compound of formula (III). The epoxy resin or liquid epoxy resin can be a commercially available epoxy resin product.

Epoxy resins are obtained, for example, from the reaction of an epoxy compound such as, for example, epichlorohydrin, with a multifunctional alcohol, i.e., a diol, triol or polyol.

Depending on the reaction management, during the reaction of multifunctional alcohols with an epoxy compound such as, for example, epichlorohydrin, the corresponding hydroxy epoxy compounds, as byproducts, can also be produced, at various concentrations. They can be isolated by conventional separation operations. However, according to the invention, it is possible to use the product mixture obtained in the glycidylization reaction of polyols consisting of polyol that has reacted completely and partially to form the glycidyl ether.

Examples of such hydroxyl-containing epoxies in epoxy resins are trimethylolpropane diglycidyl ether contained as a mixture in trimethylolpropane triglycidyl ether, glycerol diglycidyl ether contained as a mixture in glycerol triglycidyl ether, pentaerythritol triglycidyl ether contained as a mixture in pentaerythritol tetraglycidyl ether. In a preferred embodiment, the hydroxyl-containing epoxy is a trimethylolpropane diglycidyl ether, which occurs in a relatively high proportion in trimethylolpropane triglycidyl ethers produced conventionally.

However, other similar hydroxyl-containing epoxies, in particular glycidol, 3-glycidyloxybenzyl alcohol or hydroxymethyl cyclohexene oxide can also be used. Preferable are epoxy resins comprising trimethylolpropane diglycidyl ether, butanediol diglycidyl ether, cyclohexane dimethanol diglycidyl ether or mixtures thereof.

Other liquid epoxy resins of formula (IV) can be used, which are described further below for the epoxy resins (A) that contain an epoxy compound of formula (III) containing a primary or secondary hydroxy group.

Particularly preferable are epoxy resins based on diglycidyl ether of bisphenol A (BADGE), bisphenol F or bisphenol A/F. These epoxy resins are available commercially on a large scale. They can be obtained from the reaction of bisphenol A, bisphenol F or mixtures of bisphenol A and bisphenol F (also referred to as bisphenol A/F) with epichlorohydrin. Depending on reaction management, high or low molecular weight reaction products can be produced.

Particularly preferable as hydroxy epoxy compound of formula (III) is the β-hydroxy ether of formula (V)

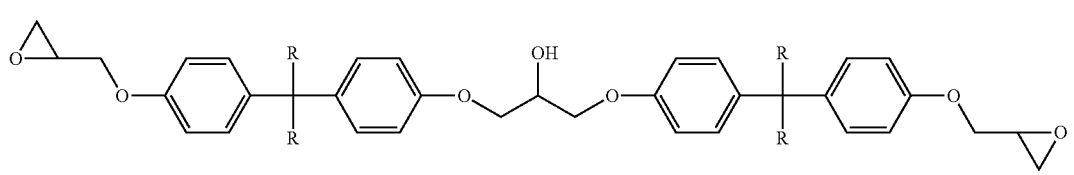

(V)

where R independently of one another is H or methyl, which is contained in commercial liquid epoxy resins produced from bisphenol A (R=CH₃) and epichlorohydrin at approximately 15%, as are the corresponding β-hydroxy ethers which are formed in the reaction of bisphenol F (R=H) or the mixture of bisphenol A and bisphenol F with epichlorohydrin. In addition to the dimer of bisphenol A-diglycidyl ether and the corresponding dimer with bisphenol F or mixtures of bisphenol A and bisphenol F according to formula (V), elongated products of the BADGE-bisphenol A addition or corresponding products with bisphenol F can also be used, which contain 3 or 4 bisphenol units, for example. Such an elongation occurs in particular if a diglycidyl ether, in particular a diglycidyl ether of bisphenol A (BADGE) or of bisphenol F, is reacted with a bisphenol at elevated temperature. It is advantageous that such a bisphenol-elongated diglycidyl ether is used with a non-elongated diglycidyl ether.

Accordingly, it is preferable to use liquid epoxy resins of formula (A-I) as epoxy resins be used. Such distillation residues, for example, Epilox® M850, contain clearly higher concentrations of hydroxy-containing epoxy compounds than standard epoxy resins.

The free primary or secondary OH functionality of the hydroxy epoxy compound of formula (III) allows an efficient reaction with terminal isocyanate groups of prepolymers, without having to use disproportionate excesses of the epoxy components for that purpose.

In a two-step reaction, for the reaction of the isocyanate-terminated prepolymer obtained in the first step from the at least two polyols and the at least one polyisocyanate, corresponding quantities of the epoxy resin having hydroxy-containing epoxies of formula (III), preferably monohydroxy epoxies, are used. An equimolar stoichiometry can be used with regard to the isocyanate groups and the hydroxyl groups, i.e., a molar ratio [OH]/[NCO] of 1; however, it is permissible to deviate therefrom. The ratio [OH]/[NCO] is, for example, suitably 0.6 to 3.0, preferably 0.7 to 1.5, and in particular 0.8 to 1.2. In a one-step process, the quantities of the individual components a), b) and c) are selected so that

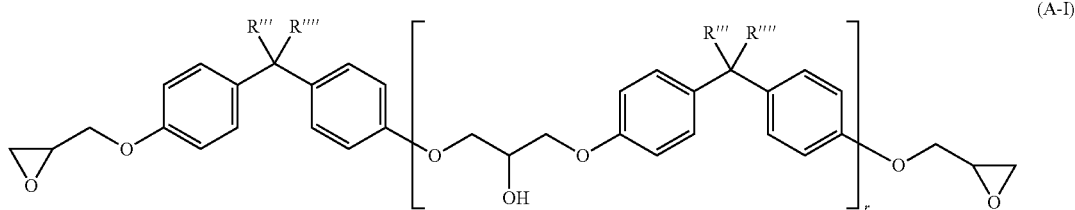

(A-I)

where the substituents R''' and R'''' independently of one another stand either for H or CH₃ and the subscript r has a value from 0.01 to 1, preferably 0.05 to 1. Preferably r stands for a value of less than 1, in particular less than 0.3 and preferably less than 0.2. The expression "independently of one another" in the definition of groups and residues in this document means in each case that groups that occur repeatedly but have the same designation in the formulas can each have different meanings.

Such liquid epoxy resins of formula (A-I) are commercial products, for example, Araldite® GY 250, Araldite® PY 304, Araldite® GY 282 (Huntsman and Hexion) or D.E.R.® 331, D.E.R.® 330 or D.E.R.® 332 (Dow) or Epikote® 828 (Hexion).

In an additional preferred embodiment, epoxy resins can be used that result from the reaction of monophenols and epoxy resins, as obtained, for example, by reacting p-methoxyphenol and D.E.R. 332. Moreover, a great variety of epoxies with a hydroxy ether group, produced by the reaction of (poly)epoxies with a substoichiometric amount of monovalent nucleophiles such as carboxylic acids, phenols, thiols or sec-amines, can be used. In an additional embodiment, distillation residues which accumulate in the production of highly purified distilled epoxy resins can also the ranges for the above-mentioned ratio [OH]/[NCO] could also be valid for the hypothetical intermediate isocyanate-terminated prepolymer formed from the components a) and b) and the component c).

In a preferred embodiment, for the synthesis of the epoxy resin-terminated polyurethane polymers, in the reaction of the epoxy resin, at least one compound selected from anhydrides, ketones and aldehydes can be used as glycol scavenger. For this purpose, in the two-step manufacturing method, the second reaction step, i.e., the reaction of the epoxy resin with the isocyanate-terminated prepolymer formed in the first step, can be carried out in the presence of the glycol scavenger.

Without any intention to commit to a theory, it is assumed that the scavenging reaction in the case of the use of an anhydride is based on the formation of a monoalcohol. By analogy with this scavenging reaction, the glycols contained in the epoxy resins can be bound alternatively via a reaction with ketones and aldehydes as ketals or acetals. The use of the glycol scavenger can lead to better homogeneity of the polymers.

In the one-step process, the glycol scavenger can be contained in the reaction mixture that contains the components a) to c). The reaction of the isocyanate-terminated prepolymer with the epoxy resin that contains the hydroxy epoxy compound can be carried out, for example, in the two-step process, preferably in the presence of the glycol scavenger. For this purpose, the isocyanate-terminated prepolymer, the epoxy resin and the glycol scavenger can be mixed with one another before the reaction in order to form the reaction mixture, wherein the additions can be made in any order. For example, first the isocyanate-terminated prepolymer can be added to the hydroxy epoxy compound, and then the glycol scavenger can be added, after which mixing by stirring occurs.

In an alternative embodiment, the presence of the glycol scavenger can be achieved in that the epoxy resin containing the hydroxy epoxy compound of formula (III) is first reacted with the glycol scavenger, and the reaction product obtained is then mixed and reacted in the one-step process with the components a) and b) or in the two-step process with the isocyanate-terminated prepolymer.

Preferably, an anhydride is used as glycol scavenger. The anhydride is an organic anhydride, i.e., a carboxylic acid anhydride. It is possible to use an anhydride or a mixture of different anhydrides. In principle, a broad palette of anhydrides is suitable as scavenger of glycol-containing species in epoxy resins or epoxy resin mixtures. Thus, aromatic, cycloaliphatic, aliphatic or difunctional anhydrides can be used.

It is also possible to use mixed anhydrides; however, as a rule, it is preferable to use anhydrides derived from a carboxylic acid. Cyclic anhydrides and derivatives thereof are particularly preferable. Such cyclic anhydrides are usually derived from dicarboxylic acids. Derivatives are understood to refer to substituted anhydrides, for example, substituted with $C_1$-$C_8$ alkyl groups, $C_1$-$C_8$ alkenyl groups, aryl groups, alicyclic or aromatic rings added by condensation, and/or anhydrides in which aromatic groups are partially or completely hydrogenated. Examples of suitable anhydrides are alkanoic acid anhydrides such as $C_2$-$C_{18}$ alkanoic acid anhydrides, and derivatives thereof, for example, acetic acid anhydride, propionic acid anhydride, butyric acid anhydride, valeric acid anhydride and stearic acid anhydride, alkanoic diacid anhydrides such as $C_4$-$C_8$ alkanoic diacid anhydrides, and derivatives thereof, for example, succinic acid anhydride, methyl succinic acid anhydride, (2-dodecen-1-yl) succinic acid anhydride, phenyl succinic acid anhydride, glutaric acid anhydride, methyl glutaric acid anhydride, 3,3-dimethyl glutaric acid anhydride and itaconic acid anhydride, alkenoic diacid anhydrides such as $C_4$-$C_8$-alkenoic diacid anhydrides, and derivatives thereof, for example, maleic acid anhydride, 2,3-dimethyl maleic acid anhydride, citraconic acid anhydride, alicyclic dicarboxylic acid anhydrides and derivatives thereof such as cyclohexane dicarboxylic acid anhydride, norbornene-2,3-dicarboxylic acid anhydride, methyl norbornene-2,3-dicarboxylic acid anhydride, camphoric acid anhydride, aromatic anhydrides and derivatives thereof such as benzoic acid anhydride, phthalic acid anhydride and derivatives thereof such as methyl phthalic acid anhydride (MPA), methyl tetrahydrophthalic acid anhydride (MTHPA), tetrahydrophthalic acid anhydride, tetraphenyl phthalic acid anhydride, methyl hexahydrophthalic acid anhydride (MHHPA) and hexahydrophthalic acid anhydride, homophthalic acid anhydride, 1,2-naphthalic acid anhydride and derivatives thereof such as 3,4-dihydro-1,2-naphthalic acid anhydride, difunctional anhydrides such as pyromellitic acid dianhydride, benzophenone tetracarboxylic acid dianhydride and biphenyl tetracarboxylic acid dianhydride and diglycolic acid anhydride. Preferred anhydrides are succinic acid anhydride, phthalic acid anhydride and derivatives thereof, in particular methyl phthalic acid anhydride and 4-methylphthalic acid anhydride. The anhydride preferably comprises the succinic acid anhydride ring or maleic acid anhydride ring as structural element.

Examples of ketones and aldehydes that can be used as glycol scavengers are formaldehyde, acetone, cyclopentanone or benzaldehyde.

When a glycol scavenger is used, the quantity in the reaction mixture can vary within broad ranges and depends on the type of the specific reaction partners used, their ratio, and the type of the glycol scavenger. For example, it is preferable to use at least 0.1% by weight, more preferably at least 0.25% by weight and particularly preferably at least 0.4% by weight, and not more than 5.0% by weight, preferably not more than 3.0% by weight, and more preferably not more than 2.50 or 2.75% by weight of glycol scavenger, preferably anhydride, relative to the quantity of epoxy resin used. It is particularly preferable to use 0.25 to 3.00% by weight, more preferably 0.50 to 1.50% by weight of glycol scavenger, preferably anhydride, relative to the quantity of epoxy resin used.

As explained above, the stoichiometry of the isocyanate-terminated prepolymer or of the starting components a) and b) used for that purpose and of the OH-functional epoxies in the epoxy resin can be controlled in the reaction so that completely blocked polymers are obtained. Also according to the invention are partially blocked polymers in which a portion of the isocyanate groups is left unreacted for reactions in a later reaction step.

The epoxy group-terminated polymer obtained preferably has a resilient character and is moreover preferably soluble or dispersible in epoxy resins. If needed and depending on the resulting viscosity, it can be diluted with additional epoxy resins. For this purpose, it is preferable to use diglycidyl ethers of bisphenol A, bisphenol F as well as bisphenol A/F, and epoxy group-bearing reactive diluents described further below, in particular hexanediol diglycidyl ether, polypropylene glycol diglycidyl ether and trimethylolpropane triglycidyl ether.

One or more solvents can be added to the component mixture. For the reaction, catalysts and/or stabilizers can also be used at the same time. The person skilled in the art is already familiar with such reactions and the appropriate additives.

The reaction can be carried out in a two-step reaction and surprisingly also in a one-pot reaction. In the one-pot reaction, the components a), b) and c) are reacted, optionally in the presence of the glycol scavenger, wherein the epoxy-terminated impact modifier is obtained directly. The method is simplified by the one-step process management.

In the two-step reaction, in the first step a), the two or more polyols of formula (I) are reacted with b) the at least one polyisocyanate of formula (II), in order to obtain an isocyanate-terminated prepolymer, and, in the second step, the isocyanate-terminated prepolymer is reacted with the epoxy resin comprising a primary or secondary hydroxy group-containing epoxy compound of formula (III), in order to obtain the epoxy group-terminated impact modifier.

Accordingly, the present invention also relates to the isocyanate-terminated prepolymer which is suitable as intermediate product for the preparation of the epoxy group-terminated impact modifier according to the invention, as well as to a method for the preparation thereof.

By means of the method according to the invention, blocked or partially blocked isocyanate-terminated prepolymers can be obtained which can be used as an epoxy group-terminated impact modifier in a one-component or two-component epoxy resin composition in order to increase the impact resistance of the cured epoxy resin matrix. The epoxy resin composition is preferably a 2K epoxy resin composition. The 2K or 1K epoxy resin composition can be liquid, pasty or solid and/or cold or heat curing.

The epoxy resin composition is preferably a 1K or 2K epoxy resin adhesive, in particular a structural or crash-resistant adhesive, for example, for OEM products, EP/PU hybrids, structural foams made of epoxy resin systems (such as Sika Reinforcer®) or repair applications.

The one-component or two-component epoxy resin composition according to the invention comprises at least the epoxy group-terminated impact modifier according to the invention. Moreover, the epoxy compositions according to the invention comprise at least one curing agent for epoxy resins, which, in the case of a one-component composition, is located in the same component as the epoxy group-terminated impact modifier or, in the case of a two-component composition, in the second component.

Depending on the epoxy resin used for producing the epoxy group-terminated impact modifier, no additional epoxy resin needs to be used in the 1K or 2K epoxy resin composition besides the epoxy group-terminated impact modifier according to the invention. However, optionally and preferably, an additional epoxy resin (A) can also be included. The additional epoxy resin (A) can be a liquid epoxy resin or a solid epoxy resin. As epoxy resin (A), all the epoxy resins already described above as epoxy resins for reaction with the isocyanate-terminated prepolymer are suitable. Below, additional suitable components and their proportions for the epoxy resin composition are described, which are also applicable for the preferred epoxy resin adhesive.

As liquid epoxy resin or solid epoxy resin (A) one can consider, in particular, the diglycidyl ethers of formula (IV)

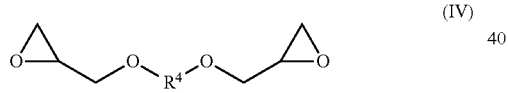

(IV)

where $R^4$ stands for a bivalent aliphatic or single-ring aromatic or a two-ring aromatic residue.

As diglycidyl ethers of formula (IV) one can consider, in particular, diglycidyl ethers of difunctional saturated or unsaturated, branched or unbranched, cyclic or open-chain $C_2$-$C_{30}$ alcohols such as, for example, ethylene glycol, butanediol, hexanediol and octanediol glycidyl ether, cyclohexane dimethanol diglycidyl ether, neopentyl glycol diglycidyl ether;

diglycidyl ethers of difunctional, low to high molecular weight polyether polyols such as, for example, polyethylene glycol diglycidyl ether, polypropylene glycol diglycidyl ether;

diglycidyl ethers of difunctional diphenols and optionally triphenols, which are understood to denote not only pure phenol but optionally also substituted phenols. Numerous substitution types are possible. This includes in particular substitution directly on the aromatic ring to which the phenolic OH group is bound. Moreover, phenols are understood to denote not only single-ring aromatic compounds, but also multiple-ring or condensed aromatic compounds or heteroaromatic compounds which have the phenolic OH group directly on the aromatic compound or heteroaromatic compound. Suitable bisphenols and optionally triphenols are, for example, 1,4-dihydroxybenzene, 1,3-dihydroxybenzene, 1,2-dihydroxybenzene, 1,3-dihydroxytoluene, 3,5-dihydroxybenzoate, 2,2-bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)hexahydro-4,7-methanoindan, phenolphthalein, fluorescein, 4,4'-[bis(hydroxyphenyl)-1,3-phenylenebis(1-methyl-ethylidene)](=bisphenol M), 4,4'-[bis(hydroxyphenyl)-1,4-phenylenebis(1-methyl-ethylidene)](=bisphenol P), 2,2'-diallyl bisphenol A, diphenols and dicresols produced by reacting phenols or cresols with diisopropylidene benzene, phloroglucinol, gallic acid ester, phenol or cresol novolacs with OH functionality from 2.0 to 3.5 as well as all the isomers of the above-mentioned compounds.

Particularly preferable as diglycidyl ethers of formula (IV) are liquid epoxy resins of formula (A-I) and solid epoxy resins of formula (A-II).

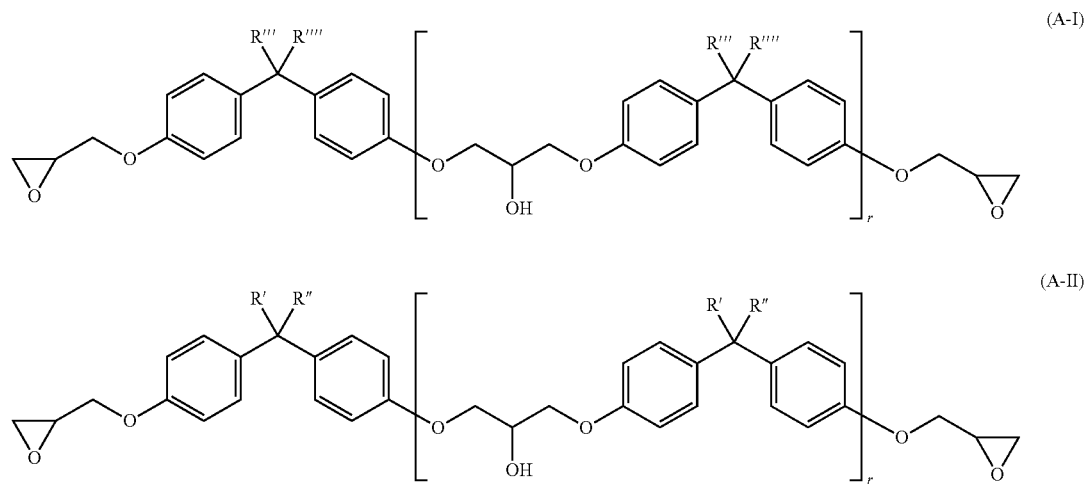

Here the substituents R', R", R'" and R"" independently of one another stand either for H or CH₃. Moreover, the subscript r has a value from 0 to 1. Preferably r has a value of less than 0.2. Moreover, the subscript s preferably has value >1, in particular >1.5, in particular from 2 to 12.

Compounds of formula (A-II) with an subscript s between 1 and 1.5 are referred to as semisolid epoxy resins by the person skilled in the art. For the present invention, they are also considered solid resins. However, solid epoxy resins in the narrow sense are preferable, i.e., where the subscript s has a value >1.5.

Such epoxy resins are commercially available from Dow or Huntsman or Hexion, for example. Commercial liquid epoxy resins of formula (A-I) have already been mentioned above.

The diglycidyl ether of formula (IV) is preferably a liquid epoxy resin, in particular a diglycidyl ether of bisphenol A (BADGE), of bisphenol F as well as of bisphenol A/F.

In one embodiment, the following are considered as curing agents for epoxy resin compositions, in particular: polyamines, polymercaptans, polyamidoamines, aminofunctional polyamine-polyepoxy adducts, which are very well known as curing agents to the person skilled in the art. In this embodiment, the composition represents a two-component epoxy resin composition which consists of two components, i.e., of a first component (K1) and a second component (K2). The first component (K1) comprises at least the impact modifier according to the invention and optionally an additional liquid epoxy resin and/or solid epoxy resin (A). The second component (K2) comprises at least one curing agent for epoxy resins. The first component (K1) and the second component (K2) are each stored in a separate container. It is only at the time of use that the two components are mixed with one another and the reactive constituents react with one another, thus leading to a cross-linking of the composition. Such two-component epoxy resin compositions are already curable at low temperatures, typically between 0° C. to 100° C., in particular at room temperature. Such cold curing two-component epoxy resin compositions can cure preferably below 100° C., more preferably from 0° C. to 80° C., particularly preferably at 10° C. to 60° C., in particular approximately at room temperature (15° C. to 30° C.). In this embodiment, the curing occurs due to an addition reaction between curing agent and the compounds comprising epoxy groups that are present in the composition. Thus, in this embodiment, it is particularly advantageous if the quantity of the curing agent in the overall composition is selected so that the epoxy-reactive groups are in a stoichiometric ratio with respect to the epoxy groups.

In an alternative embodiment, in particular for the one-component composition, the curing agent for epoxy resins is one that is activated by elevated temperature. In this embodiment, the composition represents a heat curing epoxy resin composition. In this document, "elevated temperature" is understood to denote as a rule a temperature above 100° C., in particular between 110° C. and 200° C. The curing agent for epoxy resins that is activated by elevated temperature is preferably a curing agent that is selected from the group consisting of dicyandiamide, guanamine, guanidine, aminoguanidine and their derivatives. Also possible are curing agents with accelerating action, such as substituted ureas such as, for example, 3-chloro-4-methylphenyl urea (chlorotoluron) or phenyl dimethyl ureas, in particular p-chlorophenyl-N,N-dimethyl urea (monuron), 3-phenyl-1,1-dimethyl urea (fenuron) or 3,4-dichlorophenyl-N,N-dimethyl urea (diuron), but also aliphatically substituted ureas. Moreover, compounds of the class of the imidazoles such as 2-isopropylimidazole or 2-hydroxy-N-(2-(2-(2-hydroxyphenyl)-4,5-dihydroimidazol-1-yl)ethyl)benzamide and amine complexes can be used.

It is preferable that the heat-activated curing agent is a curing agent which is selected from the group consisting of dicyandiamide, guanamine, guanidine, aminoguanidine and their derivatives; substituted ureas, in particular, 3-chloro-4-methylphenyl urea (chlorotoluron), or phenyldimethyl urea, in particular, p-chlorophenyl-N,N-dimethyl urea (monuron), 3-phenyl-1,1-dimethyl urea (fenuron), 3,4-dichlorophenyl-N,N-dimethyl urea (diuron) or also aliphatically substituted ureas such as imidazoles and amine complexes. Dicyandiamide is preferable as curing agent.

The total content of the curing agent for epoxy resins which is activated by elevated temperature is advantageously 0.5 to 12% by weight, preferably 1 to 8% by weight relative to the weight of the entire composition.

It is preferable that the composition moreover comprises at least one additional optional impact modifier (SM) which is different from the epoxy-terminated impact modifier according to the invention that has already been described. The additional impact modifiers (SM) can be solid or liquid.

In an embodiment, this additional impact modifier (SM) is a liquid rubber (SM1), which is a carboxyl- or epoxy-terminated acrylonitrile/butadiene copolymer or a derivative thereof. Such liquid rubbers are commercially available, for example, under the name Hypro® (formerly Hycar®) CTBN and CTBNX and ETBN from Emerald Performance Materials LLC. Particularly suitable as derivatives are epoxy group-comprising elastomer-modified prepolymers as commercially marketed under the product line Polydis®, preferably from the product line Polydis® 36, from the company Struktol® (Schill+Seilacher Group, Germany), or under the product line Albipox® (Evonik Hanse GmbH, Germany). In an additional embodiment, the impact modifier (SM) is a liquid polyacrylate rubber (SM1), which is completely miscible with liquid epoxy resins and starts to undergo demixing only when the epoxy resin matrix cures to form microdroplets. Such liquid polyacrylate rubbers are available, for example, under the name 20208-XPA from Rohm and Haas.

It is clear to the person skilled in the art that mixtures of liquid rubbers can naturally also be used, in particular mixtures of carboxyl- or epoxy-terminated acrylonitrile/butadiene copolymers or derivatives thereof with epoxy-terminated polyurethane prepolymers.

In a further embodiment, the additional impact modifier (SM) is a solid impact modifier which is an organic ion-exchanged sheet mineral. The ion-exchanged sheet mineral can be either cation-exchanged or an anion-exchanged sheet mineral. It is also possible for the composition to simultaneously contain a cation-exchanged sheet mineral and an anion-exchanged sheet mineral.

The cation-exchanged sheet mineral is here obtained from a sheet mineral in which at least some of the cations have been exchanged for organic cations. Examples of such cation-exchanged sheet minerals are in particular those mentioned in U.S. Pat. No. 5,707,439 or in U.S. Pat. No. 6,197,849. There, the method for producing these cation-exchanged sheet minerals is also described. A sheet silicate is preferable as sheet mineral. The sheet mineral is particularly preferably a phyllosilicate as described in U.S. Pat. No. 6,197,849, column 2, line 38 to column 3, line 5, in particular a bentonite. A sheet mineral such as kaolinite or a montmorillonite or a hectorite or an illite has been shown to be particularly suitable.

At least some of the cations of the sheet mineral are replaced with organic cations. Examples of such cations are n-octylammonium, trimethyldodecylammonium, dimethyldodecylammonium or bis(hydroxyethyl)octadecylammonium or similar derivatives of amines which can be obtained from natural fats and oils; or guanidinium cations or amidinium cations; or cations of the N-substituted derivatives of pyrrolidine, piperidine, piperazine, morpholine, thiomorpholine; or cations of 1,4-diazobicyclo[2.2.2]octane (DABCO) and 1-azo-bicyclo[2.2.2]octane; or cations of N-substituted derivatives of pyridine, pyrrole, imidazole, oxazole, pyrimidine, quinoline, isoquinoline, pyrazine, indole, benzimidazole, benzoxaziol, thiazole phenazine and 2,2'-bipyridine. Also suitable are cyclic amidinium cations, in particular those disclosed in U.S. Pat. No. 6,197,849 in column 3, line 6 to column 4, line 67.

Preferred cation-exchanged sheet minerals are known to the person skilled in the art under the name Organoclay or Nanoclay and are commercially available, for example, under the group names Tixogel® or Nanofil® (Siidchemie), Cloisite® (Southern Clay Products) or Nanomer® (Nanocor Inc.) or Garmite® (Rockwood).

The anion-exchanged layered mineral is obtained from a sheet mineral in which at least some of the anions have been exchanged for organic anions. An example of an anion-exchanged sheet mineral is a hydrotalcite in which at least some of the carbonate anions of the intermediate layers have been exchanged for organic anions.

In an additional embodiment, the additional impact modifier (SM) is a solid impact modifier which is a block copolymer (SM2). The block copolymer (SM2) is obtained from an anionic or controlled free radical polymerization of methacrylic acid ester with at least one additional monomer having an olefinic double bond. As the monomer having an olefinic double bond it is particularly preferable to use those in which the double bond is conjugated directly with a heteroatom or with at least one additional double bond. Particularly suitable monomers are those selected from the group comprising styrene, butadiene, acrylonitrile and vinyl acetate. It is preferable to use acrylate-styrene-acrylic acid (ASA) copolymers available, for example, under the name GELOY® 1020 from GE Plastics. Particularly preferable block copolymers (SM2) are block copolymers made of methyl methacrylate, styrene and butadiene. Such block copolymers can be obtained, for example, as triblock copolymers under the group name SBM from Arkema.

In an additional embodiment, the additional impact modifier (SM) is a core-shell polymer (SM3). Core-shell polymers consist of a resilient core polymer and a rigid shell polymer. Particularly suitable core-shell polymers consist of a core made of resilient acrylate or butadiene polymer which is enclosed by a rigid shell of a rigid thermoplastic polymer. This core-shell structure forms either spontaneously as a result of demixing of a block copolymer or as a result of the polymerization management as latex or suspension polymerization with subsequent grafting. Preferred core-shell polymers are so-called MBS polymers that are available commercially under the trade names Clearstrength® from Arkema, Paraloid® from Dow (formerly Rohm and Haas) or F-351® from Zeon.

Core-shell polymer particles that are already in the form of a dried polymer latex are particularly preferable. Examples thereof are GENIOPERL® M23A from Wacker with polysiloxane core and acrylate shell, radiation-cross-linked rubber particles of the NEP series, produced by Eliokem, or Nanoprene® from Lanxess or Paraloid® EXL from Dow. Additional comparable examples of core-shell polymers are offered under the name Albidur® by Evonik Hanse GmbH, Germany. Also suitable are nanoscale silicates in epoxy matrix as offered under the commercial name Nonopox by Evonik Hanse GmbH, Germany In an additional embodiment, the additional impact modifier (SM) is a reaction product (SM4) of a carboxylated solid nitrile rubber with excess epoxy resin.

The proportion of the above-described additional impact modifier(s) (SM) which is/are different from the epoxy-terminated impact modifier according to the invention, is, for example, 0 to 45% by weight, preferably 1 to 45% by weight, in particular 3 to 35% by weight relative to the weight of the entire composition.

The composition can naturally also comprise other constituents. They are in particular fillers (F), reactive diluents (G) such as epoxy group-bearing reactive diluents, catalysts, stabilizers, in particular heat and/or light stabilizers, thixotropic agents, plasticizers, solvents, mineral or organic fillers, blowing agents, dyes and pigments, corrosion inhibitors, surfactants, defoamers and adhesive promoters. For these additives, all those known in the art can be used in the usual quantities.

The fillers (F) are, for example, preferably mica, talc, kaolin, wollastonite, feldspar, syenite, chlorite, bentonite, montmorillonite, calcium carbonate (precipitated or ground), dolomite, quartz, silicas (pyrogenic or precipitated), cristobalite, calcium oxide, aluminum hydroxide, magnesium oxide, hollow ceramic beads, hollow glass beads, organic hollow beads, glass beads, color pigments. Fillers (F) denote both the organically coated forms and also the uncoated forms that are commercially available and known to the person skilled in the art.

Advantageously the total proportion of the entire filler (F) is 3 to 50% by weight, preferably 5 to 35% by weight, in particular 5 to 25% by weight relative to the weight of the entire composition.

The reactive diluents (G) are, in particular:

Glycidyl ethers of monofunctional, saturated or unsaturated, branched or unbranched, cyclic or open-chain $C_4$-$C_{30}$ alcohols selected in particular from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.

Glycidyl ethers of difunctional, saturated or unsaturated, branched or unbranched, cyclic or open-chain $C_2$-$C_{30}$ alcohols selected in particular from the group consisting of ethylene glycol, butanediol, hexanediol and octanediol glycidyl ether, cyclohexane dimethanol diglycidyl ether and neopentyl glycol diglycidyl ether.

Glycidyl ethers of tri- or polyfunctional, saturated or unsaturated, branched or unbranched, cyclic or open-chain alcohols such as epoxidized castor oil, epoxidized trimethylolpropane, epoxidized pentaerythritol or polyglycidyl ethers of aliphatic polyols such as sorbitol, glycerol or trimethylolpropane.

Glycidyl ethers of phenol and aniline compounds selected in particular from the group consisting of phenyl glycidyl ether, cresyl glycidyl ether, p-tert-butylphenyl glycidyl ether, nonyl phenol glycidyl ether, 3-n-pentadecenyl glycidyl ether (from cashew nut shell oil), N,N-diglycidylaniline and triglycidyl of p-aminophenol.

Epoxidized amines such as, N,N-diglycidyl cyclohexylamine.

Epoxidized mono- or dicarboxylic acids selected in particular from the group consisting of neodecanoic acid glycidyl ester, methyacrylic acid glycidyl ester, benzoic acid glycidyl ester; phthalic acid, tetra- and hexahydrophthalic acid diglycidyl ester and diglycidyl esters of dimeric fatty acids as well as terephthalic acid and trimellitic acid glycidyl esters.

Epoxidized di- or trifunctional, low to high molecular weight polyether polyols, in particular polyethylene glycol diglycidyl ether or polypropylene glycol diglycidyl ether.

Particularly preferable are hexanediol diglycidyl ether, cresyl glycidyl ether, p-tert-butylphenyl glycidyl ether, polypropylene glycol diglycidyl ether and polyethylene glycol diglycidyl ether.

Advantageously the total proportion of the reactive diluent (G), if used, is 0.1 to 20% by weight, preferably 1 to 8% by weight relative to the weight of the entire composition.

Suitable plasticizers are, for example, phenyl alkyl sulfonic acid esters or benzene sulfonic acid N-butylamide, which are available as Mesamoll® or Dellatol BBS from Bayer.

Suitable stabilizers are, for example, optionally substituted phenols such as butyl hydroxytoluene (BHT) or Wingstay®T (Elikem), sterically hindered amines or N-oxyl compounds such as TEMPO (Evonik).

In a particular embodiment, the composition moreover contains at least one physical or chemical blowing agent, in particular in a quantity from 0.1 to 3% by weight relative to the weight of the composition. Particularly preferable blowing agents are chemical blowing agents that release a gas when heated, in particular, to a temperature from 100 to 200° C. The blowing agent can be an exothermic blowing agent such as, for example, azo compounds, hydrazine derivatives, semicarbazides or tetrazoles. Azo dicarbonamide and oxybis(benzenesulfonyl hydrazide), which release energy during decomposition, are preferable.

Furthermore, endothermic blowing agents are also suitable, such as sodium bicarbonate/citric acid mixtures, for example. Such chemical blowing agents are available, for example, under the name Celogen® from Chemtura. Also suitable are physical propellants marketed under the trade name Expancel® from Akzo Nobel. Expancel® and Celogen® are particularly preferable.

Additional examples of preferred compositions and proportions thereof for 1K and 2K epoxy resin adhesives with the epoxy group-terminated impact modifier are listed. The percent indications are based on the weight.

1K Adhesives:
A) 0-60% base epoxy resins (liquid resin, solid resin, epoxidized novolacs, etc.)
B) 20-80%, preferably 30-60% of the epoxy-terminated PU polymer according to the invention in mixture with liquid resins (BADGE, etc.)
C) 0-40%, preferably 10-25% blocked PU polymer
D) 0-30%, preferably 5-20% CTBN derivative (Hycar adducts, for example, with BADGE)
E) 0-15%, preferably 2.5-7.5% reactive diluent (for example, hexanediol diglycidyl ether)
F) 0-25% additional nonreactive flexibilizer rubber particles (SM2), nanoscale core-shell (SM3) or also HAT paste (MDI and monobutylamine adduct, see EP 1152019)
G) 2-10%, preferably 3-4.5% curing agent and catalysts
H) 10-40%, preferably 15-25% organic or mineral fillers
I) additives and auxiliary agents (for example, superplasticizers, pigments, adhesive promoters)

2K Adhesives:
A component:
A) 5-80%, preferably 30-60% of the mixed/partially blocked polymer in mixture with liquid resins (BADGE, etc.)
b) 0-50% liquid resin (BADGE, etc.)
C) 0-20% solid resin
D) 0-10% reactive diluent (for example, hexanediol diglycidyl ether)
E) 0-25% CTBN derivative (for example, with BADGE)
F) 0-25% additional nonreactive flexibilizer rubber particles (SM2), nanoscale core-shell (SM3) or HAT paste (MDI and monobutylamine adduct, EP 1152019)
G) 0-50% organic or mineral fillers
H) additives and auxiliary agents (for example, superplasticizers, pigments, adhesive promoters)
B component:
A) 0-60% aliphatic, cycloaliphatic polyamines (and/or epoxy adducts thereof)
B) 0-60% polyoxyalkyleneamines
C) 0-60% polyamides/imidazolines (and/or epoxy adducts thereof)
D) 0-60% amidoamines (and/or epoxy adducts thereof)
E) 0-60% polyoxyalkylene polyamides (and/or epoxy adducts thereof)
F) 0-60% Mannich bases or phenalkamines (and/or epoxy adducts thereof)
G) 0-10% tertiary amines
H) 0-50% organic or mineral fillers
I) additives and auxiliary agents (for example, superplasticizers, pigments, adhesive promoters)

Preferred polyamines for the curing agent (B component) are polyetheramines such as 4,7,10-trioxa-1,13-tridecanediamine, 4,9-dioxadodecane-1,12-diamine, adducts such as 4,7,10-trioxa-1,13-tridecanediamine, 4,9-dioxadodecane-1,12-diamine, and polyoxyalkyleneamines (for example, Jeffamin® D400). Phenalkalmines such as Aradur® 3460, purely aliphatic amines, or mixed aliphatic polyether structures as in Jeffamin RFD270.

In the case of the two-component epoxy resin composition, after mixing the first component (K1) and the second component (K2), a reaction occurs, which leads to the curing of the composition. In an additional embodiment, namely the one-component heat curing epoxy resin composition, the curing occurs by heating the composition to a temperature that is above the heat activation of the thermally activated curing agent. This curing temperature is preferably a temperature in the range from 100° C. to 220° C., preferably 120 to 200° C.

The composition is optimally suitable as adhesive and is preferably used for bonding at least two substrates. The adhesives are particularly suitable for cars or add-on modules or installations for vehicles. The compositions according to the invention are also suitable for other application fields. Particular mention should be made of related applications in the manufacturing of transport means such as ships, trucks, buses or railway vehicles, in the construction of consumer products such as washing machines, for example, but also in the building sector, for example, as stiffening structural adhesives. Using a composition according to the invention, it is possible to produce not only adhesives but also sealing compositions or coatings.

The materials to be bonded or coated are preferably metals and plastics such as ABS, polyamide, polyphenylene ether, composite materials such as SMC, unsaturated GFK polyesters, epoxy or acrylate composite materials. The application in which at least one material is a metal is preferable. The bonding of identical or different metals, particularly in body shell construction in the automobile industry, is particularly preferable. The preferred metals are primarily steel, and particularly zinc-coated, hot-dip galvanized, oiled steel, Bonazinc coated steel, and additionally phosphated steel, as well as aluminum in particular in the variants that are typically used in building cars.

EXAMPLES

Below, several examples are presented that further illustrate the invention but are not intended to limit the scope of the invention in any way. Unless otherwise indicated, all the proportions and percentages are based on weight.

TABLE 1

| PolyTHF ® 2000 | Polyol, (difunctional polybutylene glycol with a molecular weight of 2000 g/mol) | BASF |
|---|---|---|
| Poly BD ® R45V | Polyol, hydroxyl-terminated polybutadiene with a molecular weight of 2800 g/mol, OH functionality approximately 2.4-2.6 | Cray Valley |
| Krasol ® LBH-P 2000 | Hydroxyl-terminated polybutadiene, OH functionality approximately 1.9 | Cray Valley |
| Ionol ® CP (=BHT) | Stabilizer | Evonik |
| Isophorone diisocyanate (=IPDI) | Isocyanate | Evonik |
| Epikote ® 828LVEL | Standard bisphenol A epoxy resin, liquid epoxy resin produced from bisphenol A and epichlorohydrin, Mw ≤ 700 | Hexion |
| D.E.R. ® 331 | Standard bisphenol A epoxy resin | Dow |
| Dibutyltin dilaurate (DBTL) | Catalyst | Thorson |
| 4-Methyl phthalic acid anhydride 95% | Glycol scavenger | Sigma-Aldrich, Art. No. 348317 |
| Winnofil ® SPM | Calcium carbonate | Solvay |
| HDK ®18 | Pyrogenic silica | Wacker |
| Tremin ® 939-100 ESST | Wollastonite, treated with epoxysilane | Quarzwerke |
| A-187 | Epoxysilane | Silquest |

Examples 1-6 and Comparison Examples 1 and 2

PolyTHF® 2000 and Krasol®LBH-P 2000 in the weight ratios indicated in Table 3, Epikote®828 LVEL (1 equivalent relative to the isocyanate groups) and methyl phthalic acid anhydride (0.75% by weight relative to Epikote) were dried for 1 hour in a vacuum at 90° C. Subsequently, IPDI (1.0 equivalent) and dibutyltin dilaurate (DBTL) were added as catalyst. The mixture was reacted for 1 h at 110° C. Then, a catalyst consisting of a bismuth compound and of an aromatic nitrogen compound was added and the reaction was continued at 110° C. until the free NCO content was less than 0.25%.

The impact modifiers 1-8 so obtained were used as tougheners 1-8 for producing 2K epoxy adhesives according to Examples 1 to 6 and Comparison Examples 1 and 2 with the following composition according to Table 2. In Comparison Example 1 (toughener 7) only PolyTHF® 2000 and no Krasol®LBH-P 2000 was used (weight ratio 1/−).

TABLE 2

|  | Proportion [% by weight] |
|---|---|
| A component | |
| Epoxy resin | 28 |
| Tougheners 1-8 | 60 |
| HDK ®18 | 5 |
| A-187 | 2 |
| Tremin ®939-100 ESST | 5 |
| B component | |
| Ancamine ® 1922A | 65 |
| Ancamine ® K54 | 10 |
| Winnofil ® SPM | 20 |
| HDI ® 18 | 5 |

The 2K epoxy adhesives obtained were tested to determine their mechanical properties. Components A and B were mixed and applied to the substrates according to the indications given below. The curing occurred for 4 h at RT (23° C.)+30 min at 85° C. or for 7 days at RT.

The determination of the tensile strength (ZF), tensile shear strength (ZSF) and the impact peel resistance (I-peel) were performed according to the methods indicated below. All the substrates were cleaned with heptane. The adhesive layer in each case had a thickness of 0.3 mm. The results are compiled in Table 3.

Tensile Shear Strength (ZSF) (DIN EN 1465)

Test specimens were produced from the described example of adhesive composition and with electrolytically zinc-coated H380 steel (EloZn) of dimensions 100×25×0.8 mm. Here, the bonding surface area was 25×10 mm with a layer thickness of 0.3 mm. The traction speed was 10 mm/min.

Dynamic Impact Peel Resistance (I-Peel, ISO 11343)

The test specimens were produced from the described example of adhesive composition and with electrolytically zinc-coated DC04 steel (EloZn) of dimensions 90×20×0.8 mm, wherein the boding surface area was 20×30 mm with a layer thickness of 0.3 mm. The impact peel resistance measurement in each case was determined three times at the temperatures indicated. The impact speed was 2 m/s.

The integral under the measurement curve (from 25 to 90% according to ISO 11343) is reported as force per unit length.

Tensile Strength (ZF) (DIN EN ISO 527)

An adhesive sample was compressed between two Teflon sheets to a layer thickness of 2 mm. After curing, the Teflon sheets were removed and the test specimens were punched out according to the DIN standard conditions. The test specimens were measured under standard atmospheric conditions with a traction speed of 2 mm/min. The tensile strength was determined according to DIN ISO 527.

TABLE 3

|  | Example 1 | Example 2 | Example 3 | Example 4 | Example 5 | Example 6 | Comparison Example 1 | Comparison Example 2 |
|---|---|---|---|---|---|---|---|---|
| Toughener | 1 | 2 | 3 | 4 | 5 | 6 | 7 | 8 |
| pTHF/Krasol*** | 7/3 | 6/4 | 5/5 | 4/6 | 3/7 | 2/8 | 1/— | 7.25/2.75 |

TABLE 3-continued

|  | Example 1 | Example 2 | Example 3 | Example 4 | Example 5 | Example 6 | Comparison Example 1 | Comparison Example 2 |
|---|---|---|---|---|---|---|---|---|
| ZF [MPa]* | 28.0 | 23.3 | 26.1 | 24.8 | 24.0 | 23.2 | 28.2 | 33 |
| E mod. (0.05-0.25%) [MPa]* | 1390 | 1320 | 1150 | 900 | 840 | 880 | 1659 | 1620 |
| ZSF [MPa]* | 29.4 | 28.2 | 30.2 | 28.8 | 28.4 | 31.1 | 17.1 | 31.5 |
| I-peel@RT* [N/mm] | 24.4 | 39.3 | 25.9 | 28.8 | 24.7 | 29.4 | 16.2 | 21.6 |
| I-peel@RT [N/mm] | 39.8 | 43.0 | 45.4 | 45.3 | 39.3 | 40.8 | 7.5 | n.d.** |
| I-peel@-30° C.* [N/mm] | 7.0 | 8.5 | 9.7 | 10.7 | 10.2 | 10.5 | 3.7 | 6.2 |

*Curing: 4 h RT + 30 min 85° C.
**Curing: 7 d RT
***Weight ratio
****not determined Mixtures for Examples 1-6, which contained polyether polyol and hydroxyl-terminated rubber, had a very fluid consistency. The production could therefore be carried out in a one-step process. The measured mechanical properties of the cured adhesives are very good. As a result of higher proportions of hydroxyl-terminated rubber, improvements in the impact peel resistance could additionally be achieved. Example 3 with a 1:1 ratio is particularly satisfactory since the resulting mechanical properties are the most advantageous.

Example 7

The method according to Examples 1 to 6 was repeated, except that, instead of Krasol®LBH-P 2000, PolyBd®R45V in the weight ratios indicated in Table 4 below was used in order to form toughener 8. The adhesive obtained was tested in the same way as in Examples 1 to 6. The results are indicated in Table 4.

TABLE 4

|  | Example 7 |
|---|---|
| Toughener | 8 |
| pTHF/PolyBd*** | 6/4 |
| ZF [MPa]* | 22.4 |
| E mod. (0.05-0.25% [MPa]* | 781 |
| ZSF [MPa]* | 22.6 |
| I-peel@RT* [N/mm] | 30.1 |
| I-peel@RT** [N/mm] | 40.5 |
| I-peel@-30° C.* [N/mm] | 4.1 |

*Curing: 4 h RT + 30 min 85° C.
**Curing: 7 d RT
***Weight ratio

Examples 8 to 12

The method according to Examples 1 to 6 was repeated, except that PolyTHF® 2000, Krasol®LBH-P 2000 and PolyBd®R45V in the weight ratios indicated in Table 5 below were used in order to form the tougheners 9 to 13. The adhesive obtained was tested in a way similar to the one used in Examples 1 to 6. The results are presented in Table 5.

TABLE 5

|  | Example 8 | Example 9 | Example 10 | Example 11 | Example 12 |
|---|---|---|---|---|---|
| Toughener | 9 | 10 | 11 | 12 | 13 |
| pTHF/Krasol/PolyBd*** | 60/0/40 | 60/40/0 | 60/40/10 | 50/25/25 | 50/40/10 |
| Viscosity [Pa · s], 25° C. | 593 | 428 | 316 | 338 | 316 |
| ZF [MPa]* | 22.4 | 23.3 | 26.0 | 24.0 | 26.0 |
| E mod. (0.05-0.25%) [MPa]* | 860 | 1440 | 1455 | 1181 | 1455 |
| ZSF [MPa]* | 22.6 | 28.2 | 27.3 | 23.3 | 27.7 |
| BD [%] | 13 | 10 | 4 | 4 | 4 |
| I-peel@RT* [N/mm] | 30.1 | 39.3 | 31.7 | 24.9 | 31.7 |
| I-peel@RT** [N/mm] | 40.5 | 43.0 | 35.6 | 22.3 | 35.6 |
| I-peel@-30° C. [N/mm] | 4.1 | 8.5 | 20.4 | 15.6 | 20.4 |

*Curing: 4 h RT + 30 min 85° C.
**Curing: 7 d RT
***Weight ratio

In Table 5 one can see that, if an impact modifier is used that contains only PolyTHF and Krasol (Example 9), the crash performance (IP peel) and the E modulus increase, while the viscosity decreases, in comparison to a PolyTHF/PolyBd impact modifier (Example 8). A mixture of Krasol and PolyBd (Example 10) additionally also shows the positive increase of the IP value at −30° C., in addition to a further decrease in viscosity.

Table 5 moreover shows the positive effect of a 10% PolyBd addition to a PolyTHF/Krasol impact modifier (Example 12). In the case of a 25% PolyBd addition (Example 11), both the crash performance and also the E modulus decrease, and the viscosity increases slightly.

Examples 13 and 14

Impact modifiers as in Examples 1 to 6 were prepared, except that as polyol a mixture of PolyTHF® 2000 and PolyBd R45V (Example 13), and of PolyTHF® 2000 and Krasol LBH P3000 (Example 14) was used. With the impact modifiers obtained, conventional 1K epoxy adhesives were prepared, and the I-peel value was determined for different temperatures that are presented in Table 6.

TABLE 6

| I-peel [N/mm] at | Example 13 PolyBd | Example 14 Krasol |
|---|---|---|
| RT | 47.0 | 40.7 |
| 0° C. | 44.3 | 37.6 |
| −15° C. | 41.4 | 35.1 |
| −30° C. | 38.3 | 30.1 |
| −40° C. | 33.0 | 21.4 |
| −50° C. | 21.8 | 14.1 |

In Table 6 it is shown that in a 1-K adhesive, Krasol (Example 14) has a negative effect on the crash performance compared to a pure PolyTHF/PolyBd impact modifier (Example 13), while in Table 5 in a 2-K adhesive precisely the opposite is the case and Krasol (Example 9) has a positive effect in comparison to the PolyTHF/PolyBd impact modifier (Example 8). The mixture (Example 10) shows positive effects particularly at RT.

Preparation Example 1

NCO-terminated Prepolymer 1

700.00 g PolyTHF 2000 (OH number 57.0 mg/g KOH), 700.00 g Poly BD R45V (OH number 43.7 mg/g KOH) and 7.00 g BHT as stabilizer were dried for 1 hour under a vacuum at 90° C. Subsequently, 280.54 g IPDI and 0.215 g dibutyltin dilaurate (DBTL) were added. The reaction was carried out for 2 h under a vacuum at 90° C.: measured free NCO content: 3.031% (theoretical NCO content: 3.090%).

Preparation Example 2

NCO-terminated Prepolymer 2

350.00 g PolyTHF 2000 (OH number 55.9 mg/g KOH), 350.00 g Poly BD R45V (OH number 46 mg/g KOH) and 3.5 g BHT as stabilizer were dried for 1 hour under a vacuum at 90° C. Subsequently, 111.15 g IPDI and 0.108 g DBTL were added. The reaction was carried out for 2 h under a vacuum at 90° C.: measured free NCO content: 3.237% (theoretical NCO content: 3.119%).

Example 15

Epikote® 828LVEL was dried for 2 hours at 90° C. under a vacuum. 120 g of the NCO-terminated prepolymer 1 produced in Preparation Example 1 were placed as starting material in a vessel. To this, 428.565 g of the dried Epikote® 828LVEL were added. Subsequently, 1.071 g 4-methylphthalic acid anhydride (0.25% by weight relative to epoxy resin) were added, followed by brief mixing. The mixture was mixed with 0.110 g DBTL, and the reaction was carried out for 2 hours in a vacuum at 110° C.

Example 16

Epikote® 828LVEL was dried for 2 hours at 90° C. under a vacuum. 120 g of the NCO-terminated prepolymer 1 produced in Preparation Example 1 were placed as starting material in a vessel. To this, 428.565 g of the dried Epikote® 828LVEL were added. Subsequently, 2.142 g 4-methylphthalic acid anhydride (0.5% by weight relative to epoxy resin) were added, followed by brief mixing. The mixture was mixed with 0.110 g DBTL and reacted for 2 hours in a vacuum at 110° C.

Example 17

Epikote® 828LVEL was dried for 2 hours at 90° C. under a vacuum. 120 g of the NCO-terminated prepolymer 1 produced in Preparation Example 1 were placed as starting material in a vessel. To this, 428.565 g of the dried Epikote® 828LVEL were added. Subsequently, 3.214 g 4-methylphthalic acid anhydride (0.75% by weight relative to epoxy resin) were added, followed by brief mixing The mixture was mixed with 0.110 g DBTL and the reaction was carried out for 2 hours in a vacuum at 110° C.

Example 18

Epikote® 828LVEL was dried for 2 hours at 90° C. under a vacuum. 120 g of the NCO-terminated prepolymer 1 produced in Preparation Example 1 were placed into a vessel as starting material. To this, 428.565 g of the dried Epikote® 828LVEL were added. Subsequently, 6.428 g 4-methylphthalic acid anhydride (1.5% by weight relative to epoxy resin) were added, followed by brief mixing. The mixture was mixed with 0.111 g DBTL, and the reaction was carried out for 2 hours in a vacuum at 110° C.

Example 19

Epikote® 828LVEL was dried for 2 hours at 90° C. under a vacuum. 120 g of the NCO-terminated prepolymer 2 produced in Preparation Example 2 were placed as starting material in a vessel. To this, 513.565 g of the dried Epikote® 828LVEL were added. Subsequently, 15.407 g 4-methylphthalic acid anhydride (3.0% by weight relative to epoxy resin) were added, followed by brief mixing. The mixture was mixed with 0.130 g DBTL and the reaction was carried out for 3 hours in a vacuum at 110° C.

Example 20

Epikote® 828LVEL was dried for 2 hours at 90° C. under a vacuum. 120 g of the NCO-terminated prepolymer 2 prepared in Preparation Example 2 were placed as starting material in a vessel. To this, 513.565 g of the dried Epikote® 828LVEL were added. Subsequently, 26.678 g 4-methylphthalic acid anhydride (5.0% by weight relative to epoxy resin) were added, followed by brief mixing. The mixture was mixed with 0.132 g DBTL and the reaction was carried out for 3 hours in a vacuum at 110° C.

Determination of the Isocyanate Content:

The isocyanate content in % by weight was determined by back titration with di-n-butylamine used in excess and 0.1 M hydrochloric acid. All the determinations were carried out semi-manually on a Mettler-Toledo titrator Model T70 with automatic potentiometric end point determination. For this purpose, in each case 600-800 mg of the sample to be determined were dissolved under heating in a mixture of 10 mL isopropanol and 40 mL xylene and subsequently reacted with a solution of dibutylamine in xylene. Excess di-n-butylamine was titrated with 0.1M hydrochloric acid and from this the isocyanate content was calculated. The determination was done 3 hours and 1 day respectively after the preparation.

Determination of the Viscosity:

Viscosity measurements were carried out using a rheometer Model MCR 101 from the manufacturer Anton Paar under rotation using a plate-plate geometry with the following parameters: 50 s$^{-1}$ rotation, 0.2 mm slit, plate-plate distance 25 mm.

The results for Examples 15 to 20 are compiled in Table 7.

TABLE 7

|  | MPA addition (% by weight) | NCO (3 h) | NCO (1 d) | Viscosity (1 d) 25/50° C., [Pa*s] |
|---|---|---|---|---|
| Example 15 | 0.25 | 0.17 | 0.15 | 139/25 |
| Example 16 | 0.50 | 0.31 | 0.27 | 54/6 |
| Example 17 | 0.75 | 0.35 | 0.29 | 51/5 |
| Example 18 | 1.50 | 0.42 | 0.31 | 51/5 |
| Example 19 | 3.00 | 1.02 | 0.48 | 71/13 |
| Example 20 | 5.00 | 0.78 | 0.25 | 287/50 |

Examples 21 to 24

In Examples 21 to 24, in a manner similar to Examples 15 to 20, an isocyanate-terminated prepolymer was blocked with an epoxy compound, wherein D.E.R.® 331 was used instead of Epikote® 828LVEL as epoxy compound. The results for Examples 21 to 24 are compiled in Table 8.

TABLE 8

|  | MPA addition (% by weight) | NCO (3 h) | NCO (1 d) | Viscosity (1 d) 25/50° C. [Pa*s] |
|---|---|---|---|---|
| Example 21 | 0.25% | 0.12% | 0.08% | 151/27 |
| Example 22 | 0.50% | 0.29% | 0.23% | 137/16 |
| Example 23 | 0.75% | 0.26% | 0.21% | 137/16 |
| Example 24 | 1.50% | 0.31% | 0.30% | 99/12 |

Example 25

Preparation of a 2K Adhesive

The following example should further illustrate the use of an impact modifier according to the invention without limiting the scope of the invention in any way. The raw materials used for this purpose are indicated in Table 9.

TABLE 9

| Raw materials used | Supplier |
|---|---|
| D.E.R. ® 331 | Dow |
| Araldite ® DY 91158 | Huntsman |
| Omyacarb ® 5GU | Omya |
| Aerosil ® R202 | Evonik |
| Epoxy resin color paste blue | Lehmann |
| Ancamine ® 1922A | Air Products |
| Ancamine ® K54 | Air Products |

For the preparation of the A component, 163.2 g of the impact modifier from Example 23 were stirred with 109.8 g of the epoxy resin D.E.R.® 331, 6.0 g of the adhesive promoter Araldite® DY91158, 0.6 g epoxy resin color paste blue, 9.0 g Omyacarb® 5GU and 12 g Aerosil® R202 in a planetary mixer at 60° C. under a vacuum to form a homogeneous paste. The liquid B component was produced at room temperature by mixing 285 g Ancamine® 1922A and 15 g Ancamine® K 54 in a planetary mixer.

From the two components, 40.0 g of the finished adhesive were obtained by mixing 32.37 g of the A component and 7.67 g of the B component in a Speedmixer® of the company Hauschild Model 600DAV FVZ at 2350 rpm for two minutes. The mixing ratio of 4.22 (A component) to 1 (B component) resulted here, as shown in Table 10, due to the selected 1:1 equivalence of NH equivalent weight to epoxy equivalent weight.

TABLE 10

|  | Proportion [%] |
|---|---|
| A component |  |
| D.E.R. ® 331 | 36.59 |
| Impact modifier Example 15 | 54.41 |
| Araldite ® DY 91158 | 2.00 |
| Omyacarb ® 5GU | 3.00 |
| Aerosil ® R202 | 4.00 |
| Color paste blue | 0.20 |
| Epoxy equivalent weight | 245.30 |
| B component |  |
| Ancamine ® 1922A | 95.00 |
| Ancamine ® K54 | 5.00 |
| NH equivalent weight | 58.20 |

Immediately after mixing the adhesive formulation, the test specimen was produced as described above for the determination of the tensile strength, the tensile shear strength as well as the impact peel resistance. After curing the sample specimens using the three curing regimens: 4 h room temperature+30 min 60° C., 1 d room temperature, 7 d room temperature, the values indicated in Table 11 were determined.

TABLE 11

| Curing |  |  |
|---|---|---|
| 4 h RT + 30 min 60° C. | ZF [MPa] | 26.34 |
|  | BE¹ RT [MPa] | 14.63 |
| 1 d RT | ZSF [MPa] | 25.41 |
|  | BE¹ RT [MPa] | 14.46 |
| 7 d RT | ZF [MPa] | 22.1 |
|  | ZSF [MPa] | 27.88 |
|  | BE¹ RT [J] | 14.15 |
|  | BE¹ 0° C. | 14.51 |
|  | BE¹ −30° C. [J] | 4.14 |

The invention claimed is:

1. Epoxy group-terminated impact modifier, comprising the reaction product of
   a) two or more polyols of formula (I)

where
   $Y_1$ stands for an n-valent residue of a reactive polymer after the removal of terminal hydroxyl groups; and
   n=2, 3 or 4;
   b) one or more polyisocyanates of formula (II)

where
   $Y_2$ stands for a divalent residue of aliphatic, cycloaliphatic, aromatic or araliphatic diisocyanates after the removal of the isocyanate groups, or for a trivalent residue of trimers or biurets of aliphatic, cycloaliphatic, aromatic or araliphatic diisocyanates after the removal of the isocyanate groups; and
   m=1 or 2; and c) at least one epoxy resin comprising an epoxy compound of formula (III)

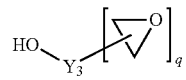 (III)

containing a primary or secondary hydroxy group, where
  $Y_3$ stands for a residue of a primary or secondary hydroxyl group-containing aliphatic, cycloaliphatic, aromatic or araliphatic epoxy after the removal of the epoxy groups and of the primary or secondary hydroxyl group; and
  q=1, 2 or 3,
wherein the polyols of formula (I) comprise
  a1) at least one polyether polyol and
  a2) an OH-terminated rubber having an OH functionality of less than or equal to 2, wherein the weight ratio of the polyether polyol to the OH-terminated rubber is in the range from 7:3 to 2:8; wherein when the epoxy group-terminated impact modifier is cured in a 2K adhesive with an epoxy resin the resin is cured at 0 to 80° C.

2. Epoxy group-terminated impact modifier according to claim 1, where the epoxy group-terminated impact modifier is obtained by reacting:
a) two or more polyols of formula (I)

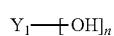 (I)

where
  $Y_1$ stands for an n-valent residue of a reactive polymer after the removal of terminal hydroxyl groups; and
  n=2, 3 or 4;
b) one or more polyisocyanates of formula (II)

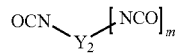 (II)

where
  $Y_2$ stands for a divalent residue of aliphatic, cycloaliphatic, aromatic or araliphatic diisocyanates after the removal of the isocyanate groups, or for a trivalent residue of trimers or biurets of aliphatic, cycloaliphatic, aromatic or araliphatic diisocyanates after the removal of the isocyanate groups; and
  m=1 or 2; and
c) at least one epoxy resin comprising an epoxy compound of formula (III)

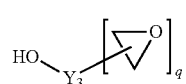 (III)

containing a primary or secondary hydroxy group, where
  $Y_3$ stands for a residue of a primary or secondary hydroxyl group-containing aliphatic, cycloaliphatic, aromatic or araliphatic epoxy after the removal of the epoxy groups and of the primary or secondary hydroxyl group; and
  q=1, 2 or 3,
wherein the polyols of formula (I) comprise
  a1) at least one polyether polyol and
  a2) an OH-terminated rubber having an OH functionality of less than or equal to 2, wherein the weight ratio of the polyether polyol to the OH-terminated rubber is in the range from 7:3 to 2:8.

3. The epoxy group-terminated impact modifier according to claim 1, wherein the epoxy group-terminated impact modifier comprises a partially blocked isocyanate-terminated prepolymer in which a portion of the isocyanate groups are unreacted.

4. The epoxy group-terminated impact modifier according to claim 1, wherein the epoxy group-terminated impact modifier comprises a completely blocked isocyanate-terminated prepolymer, wherein
  the completely blocked isocyanate-terminated prepolymer is obtained from the reaction of an isocyanate-terminated prepolymer with the epoxy compound (III), and
  the isocyanate-terminated prepolymer is formed when the two or more polyols of formula (I) are reacted with the at least one polyisocyanate of formula (II).

5. Epoxy group-terminated impact modifier according to claim 1, wherein the at least one epoxy resin c) is a reaction product of at least one epoxy and at least one diol, triol or higher-valence polyol, where the reaction product is selected from the group consisting of a bisphenol A-diglycidyl ether product, a bisphenol F-diglycidyl ether product and a bisphenol A/F-diglycidyl ether product.

6. Epoxy group-terminated impact modifier according to claim 1, wherein the weight ratio of the polyether polyol to the OH-terminated rubber is in the range from 6:4 to 2:8.

7. Epoxy group-terminated impact modifier according to claim 1, wherein the weight ratio of the polyether polyol to the OH-terminated rubber is in the range from 6:4 to 3:7.

8. Epoxy group-terminated impact modifier according to claim 1, wherein the epoxy group-terminated impact modifier is a first constituent of a two-component epoxy resin composition, the two-component epoxy resin composition consisting of the first constituent and a second constituent, the second constituent including at least one curing agent for epoxy resins.

9. Epoxy group-terminated impact modifier according to claim 1, wherein the resin is cured at 0 to 80° C. within a period of from 1 to 7 days.

10. Method for producing an epoxy group-terminated impact modifier according to claim 1, comprising the reaction of
a) two or more polyols of formula (I)

 (I)

where
  $Y_1$ stands for an n-valent residue of a reactive polymer after the removal of terminal hydroxyl groups; and
  n=2, 3 or 4;

b) one or more polyisocyanates of formula (II)

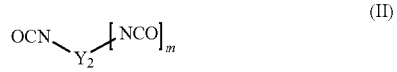
(II)

where
Y$_2$ stands for a divalent residue of aliphatic, cycloaliphatic, aromatic or araliphatic diisocyanates after the removal of the isocyanate groups, or for a trivalent residue of trimers or biurets of aliphatic, cycloaliphatic, aromatic or araliphatic diisocyanates after the removal of the isocyanate groups; and
m=1 or 2; and
c) at least one epoxy resin comprising an epoxy compound of formula (III)

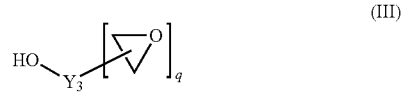
(III)

containing a primary or secondary hydroxy group,
where
Y$_3$ stands for a residue of a primary or secondary hydroxyl group-containing aliphatic, cycloaliphatic, aromatic or araliphatic epoxy after the removal of the epoxy groups and of the primary or secondary hydroxyl group; and
q=1, 2 or 3,
wherein the polyols of formula (I) comprise
a1) at least one polyether polyol and
a2) an OH-terminated rubber having an OH functionality of less than or equal to 2, wherein the weight ratio of the polyether polyol to the OH-terminated rubber is in the range from 7:3 to 2:8.

11. Method according to claim 10, wherein the OH-terminated rubber a2) is at least one member selected from the group consisting of hydroxyl-terminated polybutadienes and castor oil-based polyols.

12. Method according to claim 10, wherein the polyether polyol a1) is a polymerization product of ethylene oxide, propylene oxide, butylene oxide or tetrahydrofuran or mixtures thereof.

13. Method according to claim 10, wherein the polyether polyol a1) has a weight average molecular weight in the range from 1000 to 3000 g/mol.

14. Method according to claim 10, wherein
the reaction is carried out in a one-pot reaction or in a two-step reaction, wherein
in the two-step reaction, in the first step, two or more polyols of formula (I) are reacted with the at least one polyisocyanate of formula (II) in order to obtain an isocyanate-terminated prepolymer, and
in the second step, the isocyanate-terminated prepolymer is reacted with the epoxy resin comprising a primary or secondary hydroxyl group-containing epoxy compound of formula (III) in order to obtain the epoxy group-terminated impact modifier.

15. Method according to claim 10, wherein the epoxy resin c) is or comprises a reaction product of at least one epoxy and at least one diol, triol or higher-valence polyol or a reaction product from an epoxy resin and at least one monophenol.

16. Method according to claim 10, wherein the epoxy resin c) is selected from a bisphenol A-diglycidyl ether product, a bisphenol F-diglycidyl ether product or a bisphenol A/F-diglycidyl ether product.

17. Method according to claim 10, wherein the isocyanate groups of an isocyanate-terminated prepolymer formed are partially or completely blocked by the reaction with the epoxy compound (III).

18. Method according to claim 10, wherein a mixture of the hydroxy-terminated rubber and Epikote 828 LVEL in a weight ratio of 40 to 60 has a haze value measured according to ASTM D1003-11$^{\varepsilon1}$ in the range from 50 to 100 and/or a mixture of polyether polyol and Epikote 828 LVEL in a weight ratio from 40 to 60 has a haze value measured according to ASTM D1003-11$^{\varepsilon1}$ in a range from 0 to 5.

19. Method according to claim 10, wherein a mixture of the epoxy group-terminated impact modifier produced and Epikote 828 LVEL in a weight ratio from 20 to 80 has a haze value measured according to ASTM D1003-11$^{\varepsilon1}$ in the range from 20 to 100.

20. Method for producing an isocyanate-terminated impact modifier according to claim 1, comprising the reaction of
a) two or more polyols of formula (I)

(I)

where
Y$_1$ stands for an n-valent residue of a reactive polymer after the removal of terminal hydroxyl groups; and
n=2, 3 or 4;
b) one or more polyisocyanates of formula (II)

(II)

where
Y$_2$ stands for a divalent residue of aliphatic, cycloaliphatic, aromatic or araliphatic diisocyanates after the removal of the isocyanate groups, or for a trivalent residue of trimers or biurets of aliphatic, cycloaliphatic, aromatic or araliphatic diisocyanates after the removal of the isocyanate groups; and
m=1 or 2;
wherein the polyols of formula (I) comprise
a1) at least one polyether polyol and
a2) an OH-terminated rubber having an OH functionality of less than or equal to 2, wherein the weight ratio of the polyether polyol to the OH-terminated rubber is in the range from 7:3 to 2:8.

21. A two-component epoxy resin composition, comprising:
an epoxy group-terminated impact modifier according to claim 1, wherein the composition is a two-component epoxy resin adhesive.

22. 2K epoxy resin composition, comprising at least one epoxy group-terminated impact modifier according to claim 1.

* * * * *